G. GROSS, Jr.
Ridge-Plow.
No. 5,800.
Patented Sept. 26, 1848.
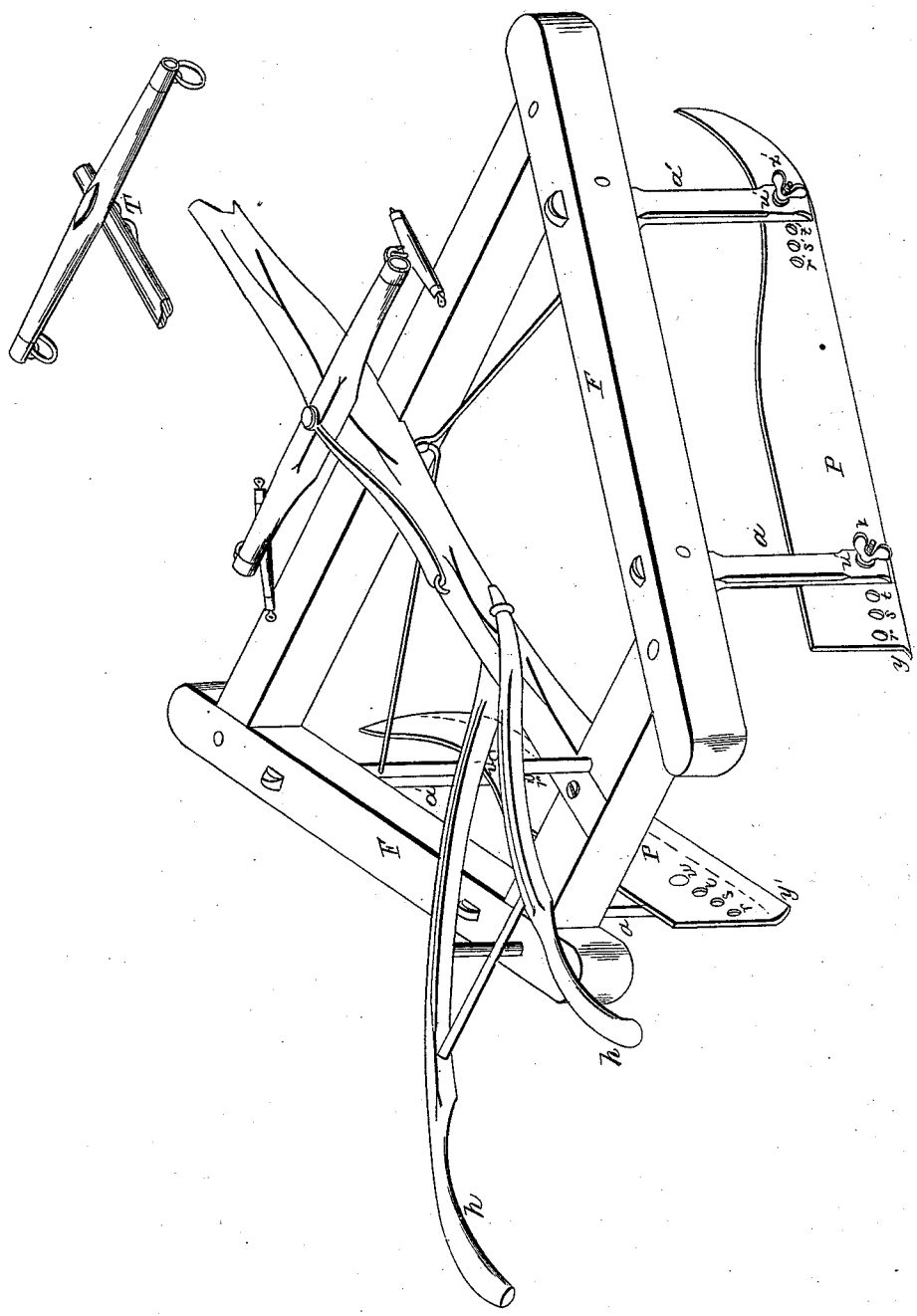

UNITED STATES PATENT OFFICE.

GEORGE GROSS, JR., OF GERMANTOWN, OHIO.

IMPROVEMENT IN CULTIVATORS.

Specification forming part of Letters Patent No. 5,800, dated September 26, 1848.

*To all whom it may concern:*

Be it known that I, GEORGE GROSS, Jr., of Germantown, in the county of Montgomery and State of Ohio, have invented a new and Improved Cultivator; and I do hereby declare that the following is a full and exact description of the same.

My invention consists in arranging the two plates or shares of the cultivator on downward-projecting arms of a frame whereof the sides are suitably inclined outward anteriorly. The said plates or shares are set vertically against the interior sides of the arms, and fixed to them by means of bolts, and throw the ridges of earth which they raise and gather as they advance toward a central line supposed to be the row of grain which the cultivator is employed in tilling.

The angle of inclination toward each other of the sides of my cultivators, and that of the arms to which the plates or shares are attached, will vary within certain limits, according to the nature of the soil on which they are to be employed. This variation in my different cultivators is made in order to avoid the adhesion of the earth to the plates and the clogging of the cultivator; but in the same cultivator the inclination remains constantly the same.

In order to adapt the cultivator for throwing its ridges to different distances from the growing plants, I provide for shifting the plates backward or forward along the supports to which they are attached. This is effected by means of series of holes in each plate, at any two of which the attaching-bolts may be set, so as to carry the plate more or less forward, and thus bring the posterior extremities of them at the required distance from each other. The holes for adjustment may be either simple round holes or slots, and either in single or multiple rows one above another.

By reference to the accompanying drawing it will be seen that the sides of the frame F F recede from each other in the anterior part toward the spire or tongue T, and converge posteriorly toward the handles $h\,h$, that the downward-projecting arms $a\,a$ and $a'\,a'$ correspond in direction with the sides of the frame F F, giving thereby corresponding inclinations to each other in the plates P P. The holes $r\,s\,t\,u$ in the posterior part of the plates P P correspond respectively with the holes $r'\,s'\,t'\,u'$ in the anterior part of the same plate or wing of the cultivator. By means of these holes and of the screw-bolts and nuts $x$ and $x'$ the wing may be placed more or less in advance on the supports $a\,a'$, and thus place the posterior extremities, $y\,y$, of the two wings at the desired distance from each other. I do not limit the number of supports $a\,a'$ to two, or any other prescribed number, nor do I place them at any fixed distance from each other in the length of the frame, but vary both with the requirements of each case.

I am aware that cultivators have been made with wings adjustable in their inclination by movements about fixed vertical axes; but this principle I do not claim, as I consider it injurious to the action of the implements so constructed.

What I do claim as my invention, and desire to secure by Letters Patent, is—

The so combining and arranging of the wings of my cultivator with the supporting-frame that their posterior extremities can be brought nearer to or separated farther from each other and the rows of corn, &c., to be cultivated thereby without varying the angle of inclination of the wings with each other, substantially in the manner and for the purposes herein set forth.

GEO. GROSS, JR.

Witnesses:
Z. C. ROBBINS,
L. WILLIAMS.